United States Patent

[11] 3,593,670

[72] Inventor Serge Aubert
 Ville D'Avray, France
[21] Appl. No. 835,118
[22] Filed June 20, 1969
[45] Patented July 20, 1971
[73] Assignee Societe Industrielle Delattre-Levivier
 "S.I.D.L."
 Paris, France
[32] Priority Aug. 2, 1968
[33] France
[31] 161,740

[54] MINE CAR SUSPENSION
 1 Claim, 3 Drawing Figs.
[52] U.S. Cl..................................................... 105/209,
 105/82, 105/165, 105/199 F, 105/218 R, 105/224
 R, 105/224.1, 105/364, 105/453, 267/3, 295/41,
 295/42
[51] Int. Cl....................................................... B60b 17/00,
 B61d 11/00, B61f 5/36

[50] Field of Search......................................... 105/82,
 165, 167, 194, 195, 209, 218, 199 F, 218 R, 224 R,
 224.1, 364, 453; 267/3; 295/41, 42

[56] References Cited
 UNITED STATES PATENTS
| 1,962,723 | 6/1934 | Pancake........................ | 105/364 |
| 2,258,663 | 10/1941 | Travilla, Jr. et al........... | 105/224.1 |
| 389,374 | 9/1888 | Feraud.......................... | 267/3 |
| 974,363 | 11/1910 | Daugherty.................... | 295/42 |
| 1,347,878 | 7/1920 | Sisson........................... | 105/165 |
| 1,854,596 | 4/1932 | Levin............................ | 105/82 |

Primary Examiner—Arthur L. La Point
Assistant Examiner—Howard Beltran
Attorney—Cameron, Kerkam and Sutton ABSTRACT: A vehicle, especially a narrow-gauge, mine car, having at least one axle on each of the journals of which the body rests by way of an equalizer bar having an axle box within the width of the wheel.

PATENTED JUL 20 1971 3,593,670

MINE CAR SUSPENSION

The invention relates to wheeled vehicles such as narrow-gauge mine cars.

The vehicles may comprise a string of cars coupled together by couplers which permit discharge by inverting in the axis of the track, the intermediate cars having a single axle of the self-centering type at the end remote from the coupler.

In conveyor installations using car strings of the type described and comprising drums for driving the strings, it is desirable that the car width should be as small as possible, taking the track width into account.

According to the invention there is provided a wheeled vehicle, more particularly a narrow-gauge mine car, characterized in that the body of the car is supported, on each of the axle journals, by a rigid equalizer which is outside the wheel and parallel to the car axis and of which the central portion forms an axle box inscribed within the crossways dimensions of the wheel, the equalizer being connected to the body at its two ends by suspension means situated in a vertical plane parallel to the car axis and passing substantially through the center of the axle journal.

The invention will now be described with reference to the embodiment given by way of example and illustrated in the accompanying drawings.

Figure 1:
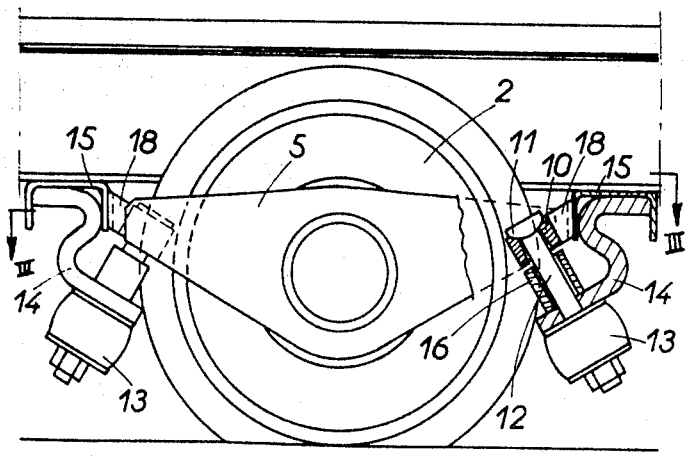
FIG. 1 is an end view of the axle, partly in section along a line I–I in FIG. 3.

The axle 1, which has two wheels 2, has end journals 3. An equalizer 5 outside the wheel 2 is centered on each of these journals by way of two ball bearings 4. The equalizer is connected by welding to a hub 6 forming an axle box. The bearings 4, which form abutments, are locked axially by means of a screw 7. A conventional resilient plug 8 and a conventional packing 9 ensure fluid tightness.

At each of its ends, the equalizer 5 carries a collar 10 facing the car axis. A spherically dished portion 11 in this collar supports a swing-hanger 12 which extends through the collar 10 and bears a resilient buffer 13 at its lower end. A support 14, attached to a crossmember 15 belonging to the car chassis bears on the collar. A stay-tube 16, between the collar 10 and the buffer 13, provides prestressing of the buffer 13 on assembly.

The two swing-hangers 12 are situated in the vertical plane situated at a distance D (FIG. 2) from the outer edge of the wheel. As a result, the suspension plane passes substantially through the center of the axle journal, near the axis of the rail 17. The overhang on the axle is therefore reduced, resulting in maximum lightening of the axle when in position. It should be noted that the two collars 10 on the equalizer 5 are situated near the periphery of the tire of the wheel 2. The resulting very short equalizer can have the necessary strength while having a narrow transverse dimension.

The lateral movements of the car chassis relative to the axle, permitted by the swinging suspension, are restricted by angle irons 18 forming stops. These angle irons are attached to the crossmembers 15 and are adapted to come into contact with the collars 10 on the equalizer 5.

Figure 2:
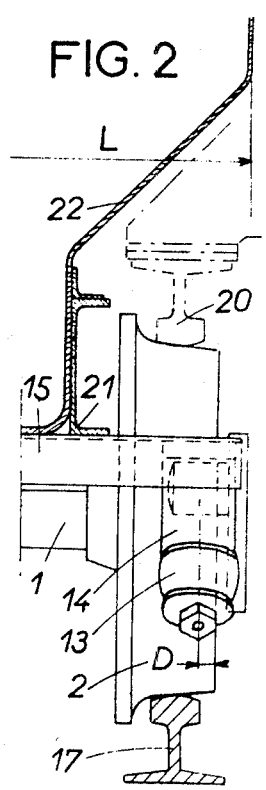
FIG. 2 is a side view of one end of the axle.
Figure 3:
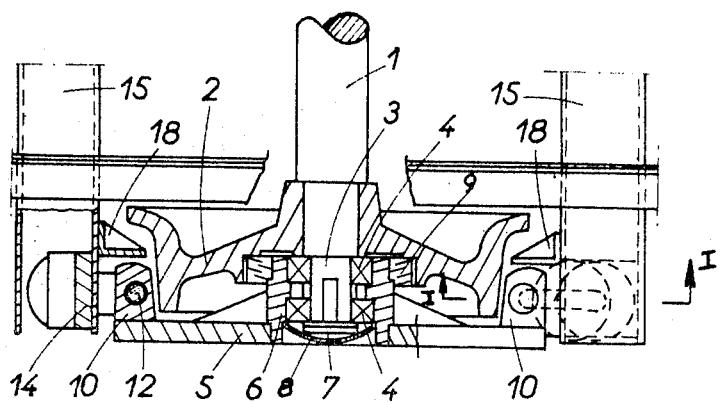
FIG. 3 is a plan view, in section along a line III–III in FIG. 1.

The overall width of the car can therefore be limited to the transverse dimension of the axle, plus the thickness of the two equalizers 5, that is, to a width L (FIG. 2). This Figure shows a car body whose profile is such that the inverted car can be sent along a return track 20, the crossmembers 15 being attached to longitudinal members 21 which support the body 22.

Obviously, the axle assembly described above could be modified, or added to, without exceeding the scope of the invention. In particular, the swinging suspension by means of swing-hangers might be replaced by conventional deformable buffers inserted between the end collars of the equalizer and part of the car chassis.

I claim:

1. In a narrow gauge mine car running on rails having the body of the car supported on wheels, axles for the wheels and axle journals for the axles, a rigid flat equalizer for each journal outside the adjacent wheel and parallel to the car axis, an axle box formed in the central portion of said equalizer substantially within the thickness of the adjacent wheel along the axle, the midplane of said box being located substantially in the midplane of the adjacent wheel and rail, collar means at each end of said equalizer directed toward the interior of the body of the car and closely adjacent the periphery of the adjacent wheel, a pair of spaced supports on each side of the body between which a respective equalizer is positioned, and suspension means connected between and extending through said collar means and said supports on the body of the car which suspension means lie in a vertical plane inside said equalizer and closely adjacent to the midplane of the adjacent wheel and rail.